United States Patent
Rainville et al.

(10) Patent No.: US 8,389,170 B2
(45) Date of Patent: Mar. 5, 2013

(54) METHOD TO DETECT NO COOLANT FLOW IN A FUEL CELL SYSTEM

(75) Inventors: Joseph D. Rainville, Caledonia, NY (US); Joseph C. Gerzseny, Spencerport, NY (US); Aaron Rogahn, Rochester, NY (US); Loren DeVries, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 424 days.

(21) Appl. No.: 12/754,298

(22) Filed: Apr. 5, 2010

(65) Prior Publication Data

US 2011/0244349 A1   Oct. 6, 2011

(51) Int. Cl.
H01M 8/04 (2006.01)

(52) U.S. Cl. .......... 429/429; 429/433; 429/437
(58) Field of Classification Search .......... 429/429, 429/433, 434, 436, 437
See application file for complete search history.

(56) References Cited

U.S. PATENT DOCUMENTS

2011/0070511 A1* 3/2011 Nelson et al. .......... 429/429

* cited by examiner

*Primary Examiner* — Mark F. Huff
*Assistant Examiner* — Monique Wills
(74) *Attorney, Agent, or Firm* — John A. Miller; Miller IP Group, PLC

(57) ABSTRACT

A method for determining whether a fuel cell stack cooling fluid is flowing at cold fuel cell system start-up. The method monitors the temperature of the cooling fluid outside of the fuel cell stack, and determines whether the temperature of the cooling fluid is increasing properly as the temperature of the stack increases.

16 Claims, 2 Drawing Sheets

METHOD TO DETECT NO COOLANT FLOW IN A FUEL CELL SYSTEM

BACKGROUND OF THE INVENTION

1. Field of the Invention

This invention relates generally to a method for determining whether a cooling fluid is flowing through a fuel cell stack at freeze start-ups and, more particularly, to a method for determining whether a cooling fluid is flowing through a fuel cell stack at freeze start-ups by monitoring the temperature of the cooling fluid outside of the stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack by serial coupling to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As mentioned above, a fuel cell stack includes cooling fluid flow channels, typically in the stack bipolar plates, that receive a cooling fluid that maintains the operating temperature of the fuel cell at a desired level. The cooling fluid is pumped through the stack and an external coolant loop outside of the stack by a high temperature pump, where a radiator typically cools the cooling fluid when it exits the stack. Temperature sensors are typically provided in the coolant loop external to the fuel cell stack to monitor the temperature of the cooling fluid as it exits and enters the stack to maintain a tight control of the stack temperature. The cooling fluid is typically a mixture of water and glycol that provides enhanced heat removal properties and reduces the freeze temperature of the cooling fluid.

In spite of the low temperature properties of the cooling fluid, it has been found that under certain low temperature conditions, the cooling fluid will become slushy and possibly freeze solid. If the vehicle or fuel cell system is started under these conditions, the cooling fluid may not flow through the flow channels in the stack and the coolant loop outside of the stack. When the cooling fluid is slushy, the small cooling fluid channels in the bipolar plates in the stack may prevent the cooling fluid from flowing. When the system is started and the cooling fluid does not properly flow, the stack waste heat causes the temperature of the stack to increase beyond its normal operating temperature, and possibly to temperatures that will damage fuel cell stack elements, such as the MEAs. Therefore, it is desirable to detect a low temperature cooling fluid at system start-up so as to prevent stack damage.

SUMMARY OF THE INVENTION

In accordance with the teachings of the present invention, a method is disclosed for determining whether a fuel cell stack cooling fluid is flowing at cold fuel cell system start-up. The method monitors the temperature of the cooling fluid outside of the fuel cell stack, and determines whether the temperature of the cooling fluid is increasing properly as the temperature of the stack increases.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining whether a cooling fluid is flowing through a fuel cell stack at system freeze start-up is merely exemplary in nature, and is in no way intended to limit the invention or its applications or uses.

Figure 1:
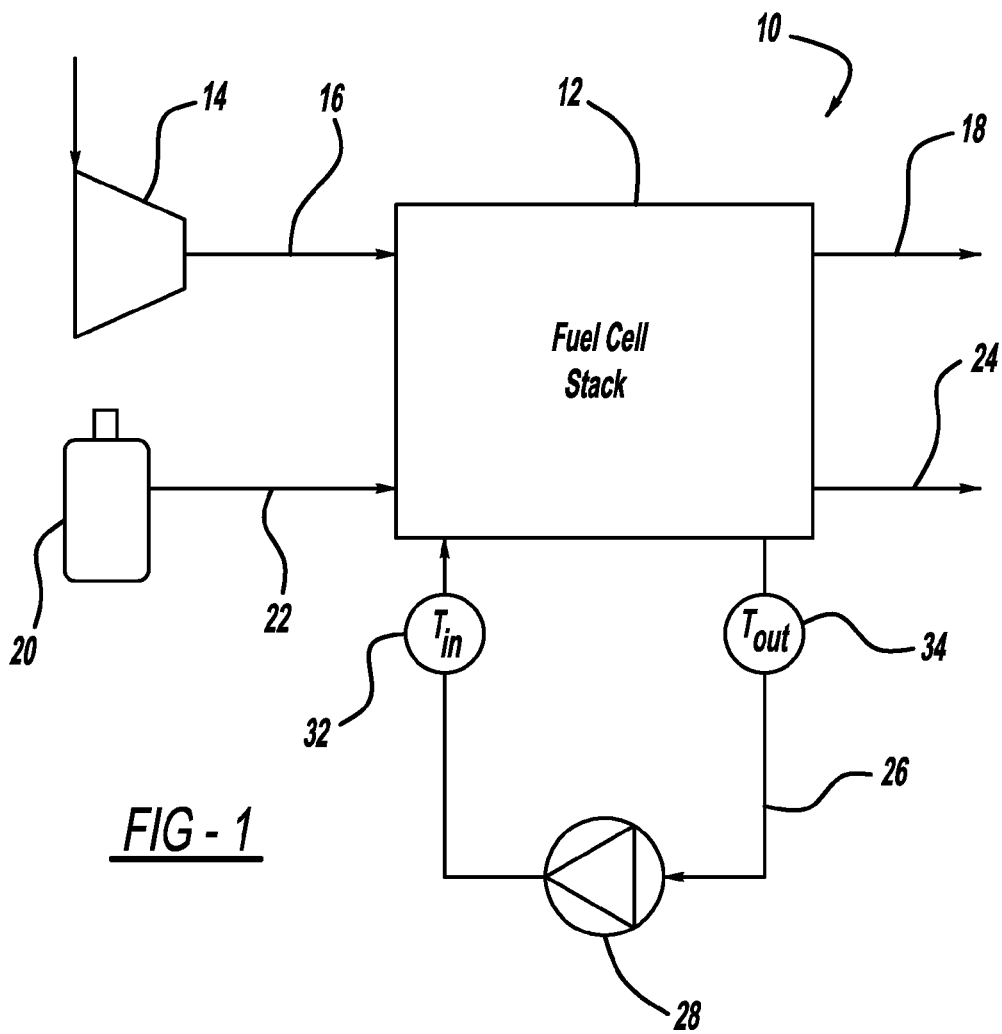
FIG. 1 is a schematic plan view of a fuel cell system including a fuel cell stack and a thermal sub-system.

FIG. 1 is a simplified schematic plan view of a fuel cell system 10 including a fuel cell stack 12. The fuel cell stack 12 includes a cathode side that receives air from a compressor 14 on a cathode input line 16 and provides a cathode exhaust gas on a cathode exhaust gas line 18. The fuel cell stack 12 also includes an anode side that receives a hydrogen gas from a hydrogen source 20, such as a high pressure tank, on an anode input line 22 and provides an anode exhaust gas on an anode exhaust gas line 24. The system 10 further includes a thermal sub-system that provides a cooling fluid flow to the fuel cell stack 12. The thermal sub-system includes a high temperature pump 28 that pumps the cooling fluid through a coolant loop 26 external to the fuel cell stack 12 and through the cooling fluid flow channels in the bipolar plates in the fuel cell stack 12. A temperature sensor 32 measures the temperature of the cooling fluid in the coolant loop 26 as it enters the fuel cell stack 12 and a temperature sensor 34 measures the temperature of the cooling fluid in the coolant loop 26 as it exits the fuel cell stack 12.

As discussed above, if the cooling fluid is slushy or frozen, then the cooling fluid may not flow through the stack flow channels and the coolant loop 26 even though the pump 28 may be spinning. Under this condition, the fuel cell stack 12 may overheat before the cooling fluid is thawed enough to flow through the fuel cell stack 12.

Figure 2:
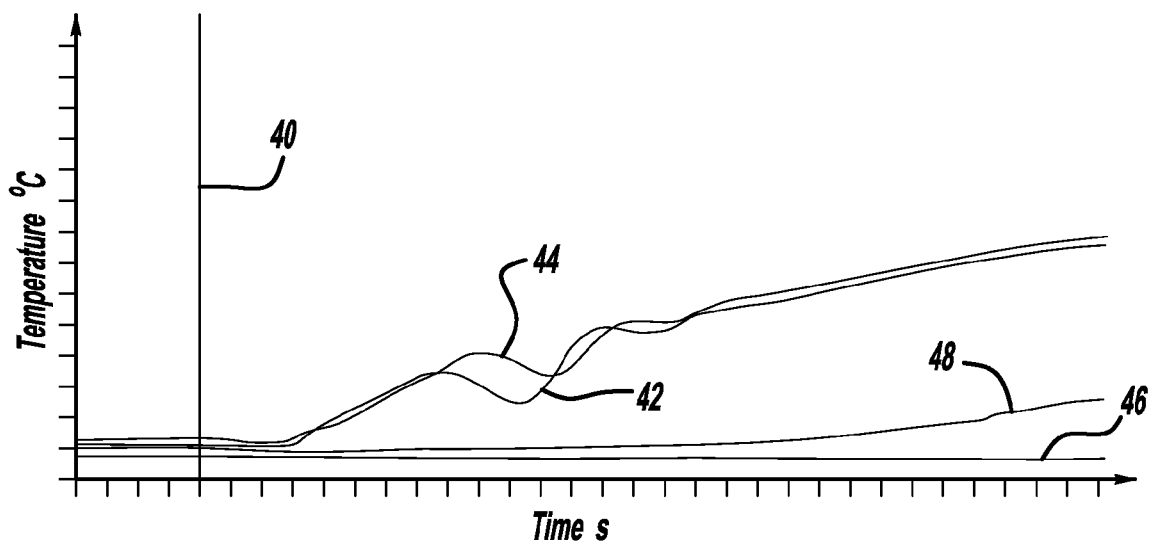
FIG. 2 is a graph with time on the horizontal axis and temperature on the vertical axis showing temperatures of the cooling fluid flowing through the thermal sub-system at system freeze start-up.

FIG. 2 is a graph with time on the horizontal axis and temperature on the vertical axis showing this type of freeze condition in relation to normal system operation. Particularly, when a system run state is initiated at line 40, air and hydrogen fuel will be provided to the fuel cell stack 12, which will then begin to generate power and waste heat. If the cooling fluid is flowing through the fuel cell stack 12 and the coolant loop 26, then the temperature of the cooling fluid will begin to increase about eight seconds after the run initiation. This is represented by graph line 42 that is the temperature of the cooling fluid measured by the inlet temperature sensor 32 and graph line 44 that is the temperature of the cooling fluid temperature measured by the outlet temperature sensor 34. If the cooling fluid is not flowing, the fuel cell stack 12 will continue to heat up as a result of the waste heat it generates, but the temperature of the cooling fluid will not increase for several seconds, and then will only increase slightly. This is represented by graph line 46 that is the temperature of the cooling fluid measured by the inlet temperature sensor 32 and graph line 48 that is the temperature of the cooling fluid measured by the outlet temperature sensor 34. By the time the cooling fluid heats up to the temperature where it will flow through the fuel cell stack 12, the stack 12 may already be damaged.

According to the invention, the relationship between the temperature of the cooling fluid when the cooling fluid is not flowing and when the cooling fluid is flowing at system freeze start-up, as shown in the graph of FIG. 2, can be used to determine whether the cooling fluid is flowing by an appropriate start-up algorithm in the system 10.

Figure 3:
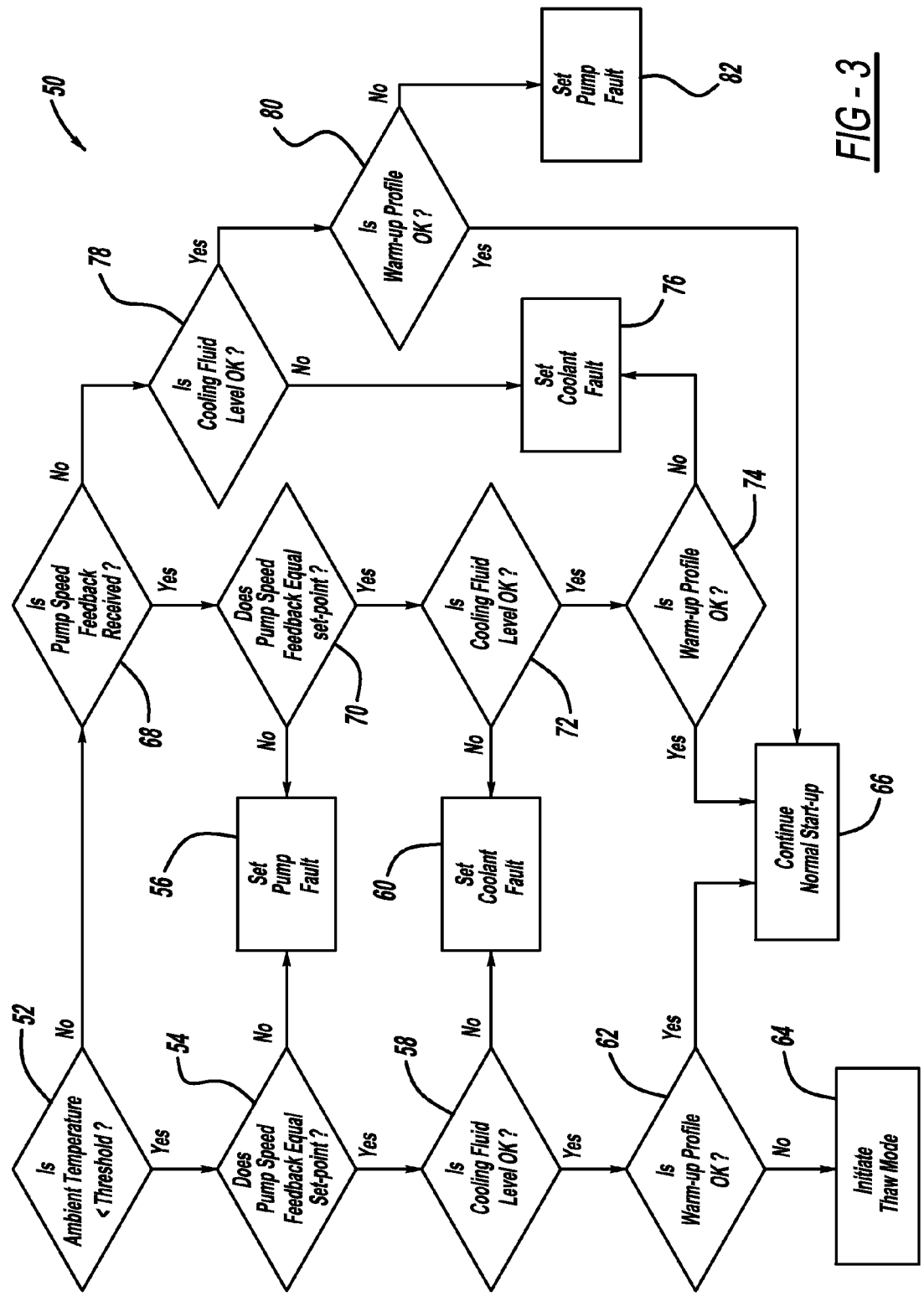
FIG. 3 is a flow chart diagram showing a process for determining if the cooling fluid is properly flowing at system start-up.

FIG. 3 is a flow chart diagram 50 showing one example of such an algorithm. The algorithm first determines whether the ambient temperature is below a certain threshold at decision diamond 52. The threshold can be any threshold suitable for a particular fuel cell system, such as the freeze temperature of water, the freeze temperature of the water/glycol mixture of the cooling fluid, or any other temperature that may be applicable. If the ambient temperature is less than the threshold of the decision diamond 52, the algorithm determines whether factors other than temperature could prevent the cooling fluid from flowing through the coolant loop 26 and the stack 12.

At decision diamond 54, the algorithm determines if a pump speed feedback signal from the pump 28 equals a controller set-point that sets the speed of the pump 28. If the pump 28 has failed and is not rotating, or is rotating at a different speed than desired, then the cooling fluid may not be properly flowing for that reason, even though it also may be frozen. If the pump speed feedback signal does not equal the set-point at the decision diamond 54, then the algorithm sets a pump fault at box 56 and the system takes other remedial actions instead of thawing the cooling fluid, such as preventing the system from starting. If the pump speed feedback signal is equal to the set-point at the decision diamond 54, then the algorithm determines whether the level of the cooling fluid is good. i.e., that there is enough cooling fluid in thermal sub-system at decision diamond 58. Any suitable technique can be used to determine the level of the cooling fluid, such as a level switch, sensor, etc. If the cooling fluid level is low or the cooling fluid is completely drained out, then that may be the reason why the temperature of the cooling fluid may not rise at system start-up. If the cooling fluid level is not good at the decision diamond 58, then the algorithm sets a cooling fluid fault at box 60, where the system may take other remedial actions besides thawing the cooling fluid, such as preventing the system from starting.

If the cooling fluid level is good at the decision diamond 58, then the algorithm determines if the cooling fluid warm-up profile is good at decision diamond 62. The algorithm determines whether the warm-up profile is good by looking at the temperature measurements from the sensors 32 and 34, as discussed above. If the temperature measurement profile is similar to the profile defined by the graph lines 46 and 48 instead of the profile defined by the graph lines 42 and 44, then the warm-up profile is not good, and the algorithm initiates a thaw mode at box 64. The thaw mode is intended to represent any suitable process for increasing the temperature of the cooling fluid without the stack operating at high power that would generate significant waste heat and damage the stack 12. If the warm up profile is good at the decision diamond 62, meaning that it is similar to the measured temperatures shown by the graph lines 42 and 44, then the algorithm causes the fuel cell system 10 to continue to a normal start-up at box 66.

If the ambient temperature is not less than the threshold at the decision diamond 52, where the cooling fluid is probably not frozen or slushy, then the algorithm determines whether a pump speed feedback is being received at decision diamond 68. What the algorithm does at this step is determine whether there is data flow from the pump 28 to a thermal sub-system controller (not shown). There are certain instances where the pump 28 may not be properly corresponding with the controller, but the pump 28 is operating properly. If the controller is receiving the pump speed feedback at the decision diamond 68, meaning that the data flow is good, the algorithm then determines whether the pump speed feedback signal equals the set-point at the decision diamond 70, and if not, the pump fault is set at the box 56 in the same manner as occurred at the decision diamond 54.

If the pump speed feedback signal is equal to the set-point at the decision diamond 70, then the algorithm determines if the cooling fluid level is good at decision diamond 72, and if not, sets the coolant fault at the box 60 in the same manner that the algorithm performed these steps at the decision diamond 58. If the cooling fluid level is good at the decision diamond 72, then the algorithm determines if the warm-up profile is good at decision diamond 74 by looking at the temperature measurement signals from the sensors 32 and 34 as was done at the decision diamond 62. At this step, instead of initiating a thaw mode if the warm-up profile is not good, the algorithm sets the coolant fault at box 76 because there is some problem with the cooling fluid flow even though it may not be the cooling fluid level. If the warm-up profile is good at the decision diamond 74, then the algorithm continues with the normal start-up procedures at the box 66.

If the pump speed feedback signals are not being received by the thermal sub-system controller at the decision diamond 68, then the algorithm determines whether the cooling fluid level is good at decision diamond 78 in the same manner as was done at the decision diamond 58, and if not, sets the cooling fluid fault at the box 76. If the cooling fluid level is good at the decision diamond 78, then the algorithm determines whether the warm-up profile is good at decision diamond 80 as was done at the decision diamond 62. If the warm-up profile is good at the decision diamond 80, then the algorithm continues to the normal start-up at the box 66. If, however, the warm-up profile is not good at the decision diamond 80, then the algorithm sets the pump fault at box 82 indicating that it is not the cooling fluid that is the problem, but probably the pump 28.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a cooling fluid is flowing through a fuel cell stack and coolant loop external to the fuel cell stack at fuel cell system start-up, said method comprising:
    starting the fuel cell stack so that it generates power and waste heat;
    measuring the temperature warm-up of the cooling fluid at least one location in the coolant loop over time after the fuel cell stack has started;
    determining a temperature warm-up profile based on the measured temperature of the cooling fluid over time;
    determining whether the temperature warm-up profile matches a first predetermined temperature profile indicating that the cooling fluid is not flowing through the fuel cell stack or whether the temperature warm-up profile matches a second predetermined temperature profile indicating that the cooling fluid is flowing through the fuel cell stack; and
    initiating a thaw mode of the cooling fluid if it is determined that the temperature warm-up profile matches the first predetermined temperature profile.

2. The method according to claim 1 wherein measuring the temperature of the cooling fluid at least one location in the coolant loop includes measuring the temperature of the cooling fluid at a location where the cooling fluid exits the fuel cell stack and at a location where the cooling fluid enters the fuel cell stack, said temperature warm-up profile being determining using both temperature measurements.

3. The method according to claim 1 further comprising determining whether a pump speed feedback signal from a high temperature pump that pumps the cooling fluid through the coolant loop and the stack is the same as a pump speed control set-point to determine if the pump speed is at the desired speed, and if not, setting a pump fault.

4. The method according to claim 1 further comprising determining whether the level of the cooling fluid is at a desired cooling fluid level, and if not, setting a cooling fluid fault.

5. The method according to claim 1 further comprising determining if the ambient temperature is less than a predetermined threshold, and measuring the temperature of the cooling fluid and determining the temperature warm-up profile if the ambient temperature is less than the threshold.

6. The method according to claim 5 further comprising determining whether a pump speed feedback signal is the same as a pump speed control set-point if it is determined that the ambient temperature is greater than the threshold, and if not, setting a pump fault.

7. The method according to claim 6 further comprising determining if the cooling fluid is warming up using the temperature warm-up profile if the pump speed feedback signal does equal the set-point, and if not, setting a cooling fluid fault.

8. The method according to claim 5 further comprising determining whether the level of the cooling fluid is at a desired cooling fluid level if it is determined that the ambient temperature is greater than the threshold, and if not, setting a cooling fluid fault.

9. The method according to claim 8 further comprising determining if the cooling fluid is warming up using the temperature warm-up profile if the cooling fluid level is at the desired cooling fluid level, and if not, setting a pump fault.

10. The method according to claim 5 further comprising determining whether a thermal sub-system controller is receiving pump speed feedback signals from the pump.

11. A method for determining whether a cooling fluid is flowing through a fuel cell stack and a coolant loop outside of the fuel cell stack at a fuel cell system start-up, said method comprising:
    starting the fuel cell stack so that it generates power and waste heat;
    turning on a high temperature pump that pumps the cooling fluid through the coolant loop and the fuel cell stack;
    measuring the temperature of the cooling fluid at a location in the coolant loop where the cooling fluid exits the fuel cell stack and at a location in the coolant loop where the cooling fluid enters the fuel cell stack over time after the fuel cell stack is started;
    determining a temperature warm-up profile based on the measured temperature of the cooling fluid at the locations where the cooling fluid enters the fuel cell stack and exits the fuel cell stack over time;
    determining if the ambient temperature is less than a predetermined threshold;
    determining whether a pump speed feedback signal is the same as a pump speed control set-point if the ambient temperature is less than the threshold, and if not, setting a pump fault;
    determining whether a level of the cooling fluid is at a desired cooling fluid level if the ambient temperature is less than the threshold, and if not, setting a cooling fluid fault;
    determining whether the temperature warm-up profile matches a first predetermined temperature profile indicating that the cooling fluid is not flowing through the fuel cell stack or whether the temperature warm-up profile matches a predetermined temperature profile indicating that the cooling fluid is flowing through the fuel cell stack; and
    initiating a thaw mode of the cooling fluid if it is determined that the temperature warm-up profile matches the first predetermined temperature profile.

12. The method according to claim 11 further comprising determining whether the pump speed feedback signal is the same as the pump speed control set-point if it is determined that the ambient temperature is greater than the threshold, and if not, setting the pump fault.

13. The method according to claim 12 further comprising determining if the cooling fluid is warming up using the temperature warm-up profile if the pump speed feedback signal does equal the set-point, and if not, setting the cooling fluid fault.

14. The method according to claim 11 further comprising determining whether the level of the cooling fluid is at a desired cooling fluid level if it is determined that the ambient temperature is greater than the threshold, and if not, setting the cooling fluid fault.

15. The method according to claim 14 further comprising determining if the cooling fluid is warming up using the temperature warm-up profile if the cooling fluid level is at the desired cooling fluid level, and if not, setting the pump fault.

16. The method according to claim 11 further comprising determining whether a thermal sub-system controller is receiving pump speed feedback signals from the pump.

\* \* \* \* \*